Figure 1:
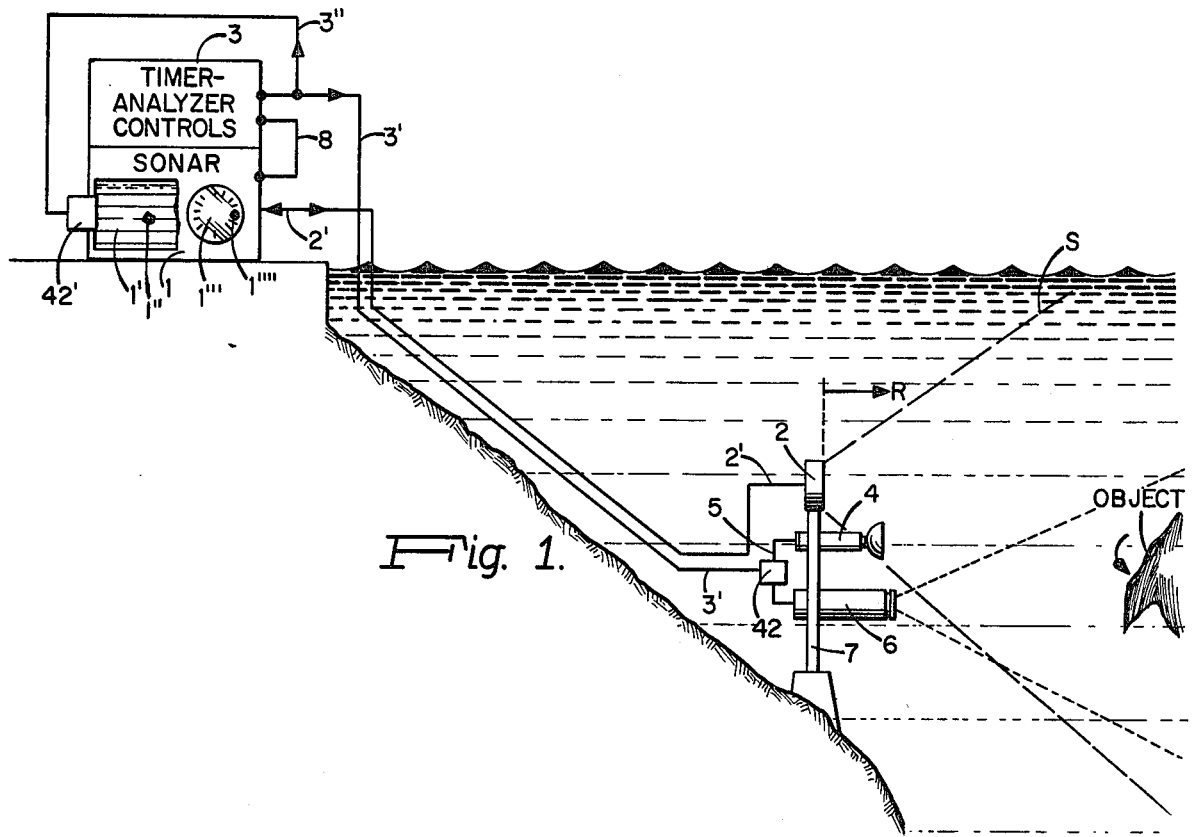

United States Patent [19]

Rines et al.

[11] 4,105,990
[45] Aug. 8, 1978

[54] PROCESS OF AND APPARATUS FOR EXPLORING OBJECTS DETECTED BY DIFFERENT ENERGY SOURCES

[75] Inventors: Robert H. Rines, Boston; Duane Marshall, Lexington, both of Mass.

[73] Assignee: The Academy of Applied Science Inc., Boston, Mass.

[21] Appl. No.: 719,381

[22] Filed: Sep. 13, 1976

[51] Int. Cl.² ........................... G01S 9/66; G01S 7/60
[52] U.S. Cl. ................................... 340/3 R; 340/3 F
[58] Field of Search ................. 343/6 R, 6 TV, 5 SA; 340/3 R, 16 C, 3 C, 3 F

[56] References Cited

U.S. PATENT DOCUMENTS

| 3,017,832 | 1/1962 | MacDonald | 340/16 C X |
| 3,119,092 | 1/1964 | Edgerton | 340/3 R |
| 3,803,598 | 4/1974 | Abernathy et al. | 340/3 R X |

OTHER PUBLICATIONS

Rines, Wyckoff, Edgerton & Klein, *Technology Review,* Mar./Apr. 1976, pp. 25-40.
Abbott, *IBM Technical Disclosure Bulletin,* vol. 12, No. 7, Dec. 1969, pp. 1119, 1120.

*Primary Examiner*—Richard A. Farley
*Attorney, Agent, or Firm*—Rines and Rines, Shapiro and Shapiro

[57] ABSTRACT

This disclosure is concerned with using different types of energy to probe for objects in media (such as water) in which one of the different types (such as acoustic energy) is more facilely propagated than another (such as light), so as to enable said one type of energy to monitor for objects of predetermined characteristics within range of another type of energy propagation and, upon detection of such, to direct the other type of energy to indicate such objects, and enable correlation of the indications of the same by both types of energy.

35 Claims, 3 Drawing Figures

PROCESS OF AND APPARATUS FOR EXPLORING OBJECTS DETECTED BY DIFFERENT ENERGY SOURCES

The present invention relates to processes of and apparatus for exploring objects detected by different energy sources, being more particularly directed toward using one type of energy that is more facilely propagated in a medium (such as acoustic energy in water) to monitor for objects of predetermined characteristics and within the detection capability in such medium of another type of energy (such as electromagnetic, including light of visible or invisible wavelengths), thus to bring into operation the other type of energy when the desired object is present and when it is within the detection capability of the other type of energy, enabling the correlation and cross-checking of the indications of such objects by both types of energy.

While it will be evident that the invention is applicable to various media and operable with various types of energy, wherever problems are present similar to those of the illustrative underwater environment herein discussed for exemplary and preferred purposes, the invention will hereinafter be illustrated in specific connection with its application to the exploration of underwater objects. The term "objects," as herein employed, is used in its generic sense to embrace any underwater item from geological and man-made structures to animate; with added ability to discriminate between relatively stationery and moving objects and objects of different predetermined characteristics, including size and range.

Acoustic energy, particularly in the form of sonar impulses, has long been used (in view of its favorable water-propagation characteristics which render it the most facilely propagating energy for underwater detection) to direct beams of sound waves, both audible and ultrasonic, into the water in order to echo from objects within the water and return the reflections and scatter of the acoustic energy from such objects, thereby to measure range and obtain a rough, though far from accurate, indication of size and other characteristics. Among more recent versions of such apparatus are those described, for example, the M. Klein and H. E. Edgerton in "Sonar — A Modern Technique for Ocean Exploration," IEEE Spectrum, June 1968, pp. 40–47. Such energy has heretofore been used, moreover, in consort with underwater photographic recording and television recording apparatus, including flood and strobe flash light illumination, for such purposes as indicating position from the bottom in order to avoid collision as described for example, in U.S. Pat. Nos. 2,996,966 and 2,975,397, in the *National Geographic*, Vol. 140, No. 2, August, 1971, p. 256 et al.

There are applications, however, where it is either too costly or otherwise inappropriate to monitor continuously with types of energy, such as visible light, of restricted range underwater or of other limiting characteristics, and/or associated with transmitting or receiving and indicating equipment that is preferably operated only when the desired object is to be detected; this, as distinguished from general facile searching or exploring as by sonar. Certainly it is wasteful and costly to keep producing photographic records underwater indiscriminatingly, until that particular type of object of certain predetermined characteristics comes into view which it is desired to photograph. The present invention, moreover, also permits the operating of the, for example, underwater light beams and associated optical recording or indicating cameras (photographic or video) only when the sonar has received acoustic reflection and scatter echoes from objects which have been analyzed and determined substantially to match said predetermined characteristics. In accordance with such operational mode, the light beam energy, directed to overlap or at least partially overlap the sonar beam, is transmitted and its receiving system is operative in response to the detecting by the sonar of the object of the desired characteristics only; and, if desired, is continued in operation, concurrently with the sonar detection only so long as the sonar indicates such object is present. Light energy, of course, provides far better definition of image or other indication of the object that the sonar indication, and has thus been brought into play at the appropriate times only, as determined by the searching sonar; the indications by the two different types of energy providing correlative checks on one another and other corroborative information, as well. Clearly, different types of electromagnetic energy, including longer or shorter wavelengths, may also be employed, as may different-frequencied acoustic energy and other energy sources, as well, all within the framework of the philosophy above stated.

An object of the invention, accordingly, is to provide a new and improved process or method of and apparatus for exploring the presence of objects in media, with multiple types of energy of differing facility of propagation in such media and differing definition and other characteristics, thus enabling correlation of information as to such objects from the indications thereof by the different energies; a preferred object being to enable such operation underwater with acoustic energy as an exploring beam, and electromagnetic energy as a fine definition, closer-range detecting tool.

A further object is to provide such a novel process and apparatus that, if desired, can also insure that the more facilely propagating energy in the medium (such as acoustic energy in water) controls the operation of the more limited energy (such as light) so that the latter is only operative when the former has analyzed and determined that an object of predetermined characteristic is present which can be properly indicated by the latter.

Other and further objects will be explained hereinafter and are more particularly delineated in the appended claims. From one of its broader points of view, however, the invention, in summary, embraces a process of exploring the presence of objects in a medium propagating one type of energy more facilely than a second type of energy, that comprises, directing energy of said one type into the medium to reflect and scatter the same from objects in said medium, indicating and analyzing the reflected and scattered energy, determining when the analyzed reflected and scattered energy matches predetermined characteristics corresponding to a particular type of object, and responding to such match by thereupon directing the second type of energy toward said object to reflect and scatter the second type of energy therefrom, indicating the second type of energy reflected and scattered from said object, and correlating the indications of said object obtained by both the first and second types of energy. Preferred details are later set forth.

Figure 2:
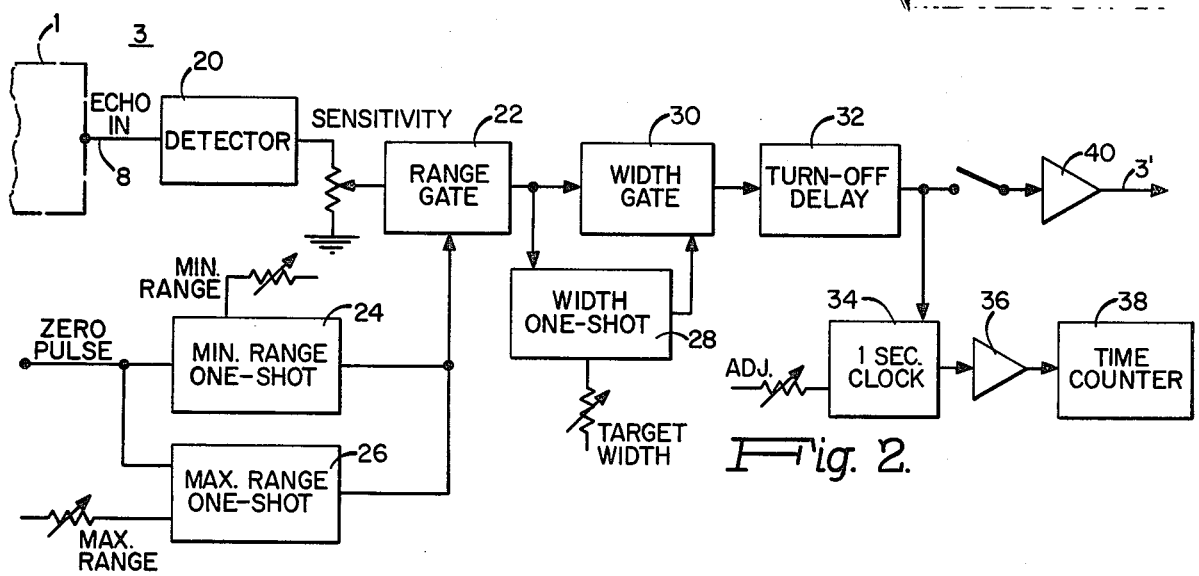
Figure 3:
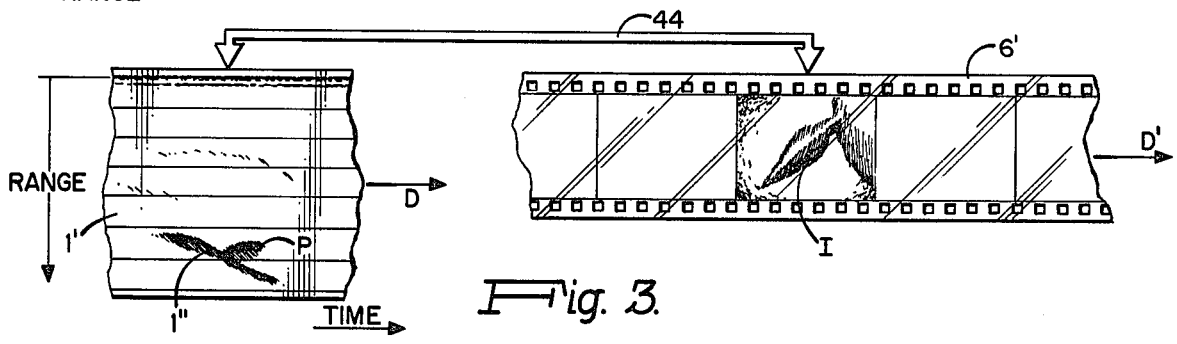

The invention will now be described with reference to the accompanying drawing,

FIG. 1 of which is a block diagram illustrating a system for practicing the invention in the illustrative application to underwater sonar-light operations;

FIG. 2 is a combined schematic circuit and block diagram of a preferred apparatus for use in the system of FIG. 1; and FIG. 3 is a fragmentary view of time-correlation comparison of sonar and optical photographic indications.

The use of the system of FIGS. 1 and 2 for strobe-photographing of large moving objects only underwater is more popularly described in an article entitled "Search for the Loch Ness Monster" by R. Rines, H. E. Edgerton, C. W. Wyckoff and M. Klein, appearing in the M.I.T. Technology Review, Vol. 78, No. 5, March/April 1976, p. 25 et seq. On page 40 of that article, references are made to scientific and other publications providing details of the specific flash-strobe and other equipment actually used in the experiments therein reported and such are incorporated herein by reference. An underwater sonar transducer 2 is illustrated in FIG. 1 as mounted on a frame 7 on a bottom ridge overlooking a channel along which large aquatic animals are believed to pass, periodically sending and receiving acoustic impulses in a beam S that acts as an underwater laterally extending detecting fence or gate. For the desired applications, the beam may also be directed partially or wholly upward or downward, as well. The transmitted or outwardly directed acoustic energy impulses from the transducer 2 are generated by a pulse sonar 1, shown disposed on-shore though it may be otherwise situated as well, including on a vessel, and energizing the transducer 2 via underwater conductors 2'. Following each periodic transmission, the receiver of the sonar 1 receives the reflected and scattered echoes of the acoustic waves from objects in the beam S, producing either or both of conventional visual indications on a fathometer type clock-like display 1''' (which shows an illuminated spot 1'''' at a circumferential position corresponding to the range from the transducer 2 in the direction R of the object reflecting and scattering the acoustic energy back to the site 7) or a time-moving chart recorder 1' on which an echo-signal-stimulated stylus produces a mark or indication 1'' at a distance below the upper baseline corresponding to the range of the detected echo.

In accordance with the particular illustrated mode, the exemplary usage is to detect and thereupon optically photograph only moving underwater objects within certain predetermined dimensional and range values — say, acoustic echoes corresponding to objects within 2 to 30 feet range of an elapsed time underwater film-recording camera 6 mounted on or near the site 7, and of size in the direction R corresponding to at least a threshold of 6 feet (to discriminate from ordinary fish). At the time the timer and analyzer system 3 connected at 8 with the sonar 1 analyzes the received echoes and determines that there are acoustic echoes being received from objects of the type matching these predetermined characteristics, i.e., lying within the 2 to 30 foot range and having echoing dimensions extending at least 6 feet in the direction R, then a signal is sent by the analyzer 3 along conductors 3' to cause the strobe light 4 to direct a light flash to illuminate the object for recording by the camera 6, synchronized by interconnection 5 with the strobe in, for example, the manner taught in said patents or in an article by H. Edgerton, V. E. MacRoberts and K. Read entitled "An Elapsed-Time Photographic System for Underwater Use, Proceedings of the Eighth International Congress on High Speed Photography," John Wiley & Sons, N.Y., 1968. Clearly other types of photographic or video light-directing and image-recording systems may also be employed, as desired.

The analyzing and characteristic-matching determination or processing in the apparatus 3 may be accomplished by the circuit of FIG. 2 in which the received a.c. echo signals are fed from the sonar receiver 1 by conductors 8 to a detector 20 where they are rectified and filtered and sent to a range gate 22. This gate is allowed to pass the signal only if it falls within the minimum range time and the maximum range time as set by respective one-shot circuits 24 and 26 with respective threshold input resistor controls, so-labelled. The range one-shot circuits 24 and 26 are fired at the time of the "zero pulse"; i.e. when the sonar pulse is transmitted by the sonar 1. The minimum range one-shot 24 will close the range gate 22 to this zero pulse and any near sonar echoes as required to avoid operating the strobe light-photographic system in response to such near echoes such as rocks, local equipment mounts or the like. The maximum range one-shot 26 when relaxed will close the range gate 22, also, but the zero pulse allows gate opening within a preset number of milliseconds by firing such one-shot circuit. About 2 feet of range is equivalent to 1 millisecond of timing, so the "MIN. RANGE" and "MAX. RANGE" adjustments readily enable the selection of, for example, the illustrative 2 - 30 feet range limits before mentioned. Both range one-shot signals are summed by diodes at the range gate 22. The input potentometer labelled "SENSITIVITY" control the threshold amplitude of received echo for which the analyzer is to respond.

The signals getting through the range gate 22 (positive range signals) thus have been analyzed such that they have met the predetermined characteristics for amplitude, range minimum, and range maximum; and are normalized to logic levels. They must now be analyzed to determine if the echo signals have the predetermined minimum dimensional extent or width in the direction R corresponding to or matching the threshold size of object that it is desired to photograph. The "width" one-shot 28 senses any positive range signal and blocks the width gate 30 for the "TARGET WIDTH" adjustment that is set; for example, just under the 6-foot width in the direction R previously suggested. If the positive range signal lasts longer, then it will get through the width gate 30 and, via turn-off delay 32, activate a clock 34 (illustrated as a 1 second adjustable timer); and, through amplifier or driver 36, operate a counter 38 that keeps track of the time that output pulses are emanating from the system 3, indicative of the sonar-detected presence of an object of the desired characteristics. Since the output from 32 feeds through relay driver 40 to set the strobe-camera 4 - 6 into periodic operation via conductors 3', as by closing relay 42 in connections 5, the counter 38 indicates the length of time that strobe photographic pictures are being taken of the desired object; and, since the periodic rate of flashing and synchronous elapsed time recording is known, as described in detail in said patent and Edgerton et al. article, the number of pictures taken of the desired object during its continued detection by the sonar will thus effectively be indicated at counter 38.

In a practical version of the system of FIG. 2, experimentally used at Loch Ness, Scotland, the one-shot circuits were constructed from two cross-coupled gates using OR coupling for one output-to-input connection. The pulse length generated was approximately 0.8RC, and was initiated by a positive input to the first gate. NAND gates were used for the range and width gates 22 and 30. A calibration input was provided to the range and width gates to enable adjustment of the same by a visual calibration light-signal indication 1'''' on the sonar indicator 1'''. The calibration of the width one-shot 28 was provided by triggering it with the end of the pulse from the minimum range one shot 24. The clock 34 was an astable, assymetrical flip-flop circuit formed by two NOR gates used as inverters. The drivers 36, 40 were identical Darlington-connected switches to ground. In order not to waste chart paper until the desired type of object within the desired range is detected by the sonar 1, the chart drive may be activated by the same signal output fed along 3' to the strobe-camera relay 42, FIG. 1, by means of conductor 3'', to activate the chart drive relay 42'. Other well-known circuit configurations for implementing the system of FIG. 2 will occur to those skilled in this art, as well as other types of circuits for performing the stated functions.

Correlation of the acoustic energy or sonar indications 1'' of the selected object upon the time-moving recording chart 1' (or other indicator or recorder) and the light-recorded film of the elapsed time camera 6 in this illustrative embodiment, shown at 6' in FIG. 3, may be effected with well-known apparatus such as planagraphs, photocell dimensional scanners and the like; and is illustrated as performed in a time-correlative manner with a simple pair of vertical reference line pointers 44, one positioned adjacent the upper margin of each of the sonar recording chart 1' and the film strip 6', with well-known drives advancing each to the right at respective rates, schematically indicated by respective arrows D and D', so that successive spaced vertical-line positions under the left-hand indicator 44 will correlate with and correspond to the particular frame of the film 6', simultaneously film-recorded with the sonar echo indicating. Thus, a protrusion P in the indicated sonar echo 1'' of the chart 1' can be correlated with the image indication I on the proper elapsed time frame of the recording film 6' from camera 6. Additionally, the dimension of the protrusion P in the vertical direction (corresponding to echoing surface in the direction R) can be correlated with the optical image dimensions I determined from calibration and/or knowledge of the optics of camera 6, providing cross-checking information. In this mode of sonar operation, moreover, with the transducer 2 fixed in position at site 7, stationary or relatively fixed echoing objects will indicate as horizontal lines on the time-moving recording chart 1' (as shown at the top of the chart in FIG. 3), whereas an object moving with a component toward or away from the transducer 2 will provide a diagonal trace (as at 1'' in FIG. 3), enabling positive discrimination of a moving target. Moving objects passing at a constant range will, of course, provide a horizontal indication for a limited time only, as distinguished from continuous permanent echoes.

While the invention has been described with reference to the particular problem of using limited-range underwater light photography to provide detailed information and correlation of predetermined types of objects detected by longer range sonar, and without wasting film or otherwise using the photography until the sonar had determined that the type of object of interest was actually present and within camera range, it has heretofore been pointed out that the process underlying the invention is equally applicable to other situations wherein such use of multiple types of energy can provide similar advantages. Further modifications will also occur to those skilled in this art, and such are considered to fall within the spirit and scope of the invention as defined in the appended claims.

What is claimed is:

1. A process of exploring the presence of objects in a medium propagating one type of energy more facilely than a second type of energy, that comprises, directing energy of said one type into the medium to reflect and scatter the same from objects in said medium, indicating and analyzing the reflected and scattered energy, determining when the analyzed reflected and scattered energy matches predetermined characteristics corresponding to a particular type of object, and responding to such match by thereupon directing the second type of energy toward said object to reflect and scatter the second type of energy therefrom, indicating the second type of energy reflected and scattered from said object, and correlating the indications of said object obtained by both the first and second types of energy.

2. A process as claimed in claim 1 and in which said analyzing step comprises processing said one type of energy to determine at least one of approximate dimensional and approximate range values of said object, and said determining step comprises matching at least one of said dimensional and range values with a corresponding predetermined approximate dimension and range of an object to be detected.

3. A process as claimed in claim 2 and in which said approximate range values are within a zone between minimum and maximum ranges.

4. A process as claimed in claim 3 and in which said maximum of the ranges corresponds substantially to the effective limit of satisfactory indication of said object by said second type of energy in said medium.

5. A process as claimed in claim 3 and in which said minimum of the ranges corresponds to the closest range at which an indication is desired of said object by said second type of energy in said medium.

6. A process as claimed in claim 3 and in which at least one of said dimensional and range limits is varied.

7. A process as claimed in claim 2 and in which said analyzing and determining steps are effected for both dimensional and range limits.

8. A process as claimed in claim 1 and in which said one type of energy is acoustic energy and said second type of energy is electromagnetic energy.

9. A process as claimed in claim 8 and in which said medium is water and said electromagnetic energy is light.

10. A process as claimed in claim 8 and in which said acoustic energy is transmitted and received as sonar signals in a medium of water, and said electromagnetic energy is strobe lighting.

11. A process as claimed in claim 10 and in which the angular beams of acoustic and light energy are adjusted at least partially to overlap.

12. A process as claimed in claim 11 and in which said determining step comprises sensing at least one of sonar echo size in the direction of the acoustic beam and gating sonar echoes to exclude echoes too close to and too far from the site of receiving the light reflections and scatter from objects.

13. A process as claimed in claim 11 and in which said beams are directed at least partially laterally through the water from sites below the surface of the water.

14. A process as claimed in claim 13 and in which said sites are disposed near or at the bottom of the body of water.

15. A process as claimed in claim 13 and in which said beams are directed at least partially upward through the water from sites below the surface of the water.

16. A process as claimed in claim 13 and in which said beams are directed at least partially downward into the water.

17. A process as claimed in claim 1 and in which said analyzing step includes discriminating between relatively fixed and moving objects in said medium.

18. A process as claimed in claim 17 and in which said responding step is effected in response to a relatively moving object of said predetermined characteristics.

19. A process of exploring the presence of underwater objects, that comprises, directing a beam of acoustic energy into the water to reflect and scatter the same from underwater objects, indicating and analyzing the acoustic energy reflected and scattered from such objects under the water, directing light energy into the water in a beam at least partially overlapping the beam of acoustic energy and during the continued directing of said beam of acoustic energy into the water in order to reflect and scatter the light from at least certain of the same objects that are reflecting and scattering the acoustic energy, indicating the objects from which the light energy is reflected and scattered, and correlating the indications of light energy and acoustic energy indications.

20. A process as claimed in claim 19 and in which said light-energy directing is effected by periodically flashing light, and the light reflection and scatter indicating step comprises optically receiving and successively recording in accordance with the successive light flash reflections and scatter.

21. A process as claimed in claim 20 and in which said recording is effected photographically.

22. A process as claimed in claim 20 and in which said receiving and recording is effected by at least one of video indicating and storing.

23. A process as claimed in claim 21 and in which the photographic recording comprises recording on elapsed time moving film synchronized with the periodically flashing light.

24. A process as claimed in claim 19 and in which the directing of light energy is effected only when the indicating and analyzing of the acoustic energy reflected and scattered from objects determines that an object of predetermined characteristics has been acoustically detected that it is desired to detect with light energy. A process as claimed in claim 24 and in which the directing of light energy continues only so long as the said indicating and analyzing of the acoustic energy determines that the desired object is still being detected by the acoustic energy.

25. A process as claimed in claim 24 and in which the directing of light energy continues only so long as the said indicating and analyzing of the acoustic energy determines that the desired object is still being detected by the acoustic energy.

26. A process as claimed in claim 24, and in which the determination of said predetermined characteristics comprises determining at least one of dimensional and range limits of the object as detected by the acoustic energy.

27. Apparatus for exploring the presence of objects in a medium propagating one type of energy more facilely than a second type of energy, having, in combination, means for directing a beam of energy of the said one type into the medium to reflect and scatter the same from objects in said medium, means for receiving the energy of said one type after reflection and scatter from such objects in said medium, means for determining when the receiving means has received such reflection and scatter from a particular type of object of predetermined characteristics, means for directing into the medium a beam of energy at least partially overlapping the first-named beam and of said second type, means for controlling the directing of the beam of energy of said second type to effect such directing when the determining means has determined the reflection and scatter of the said one type of energy from said particular type of object, and means for receiving the reflection and scatter of said second type of energy from said particular type of object in order to enable correlating the same with the reflection and scatter therefrom by said one type of energy.

28. Apparatus as claimed in claim 27 and in which means is provided to control the means for directing the said second type of energy to limit its operation to the times only that the means for receiving the said one type of energy is receiving reflection and scatter from said particular type of object.

29. Apparatus as claimed in claim 27 and in which said one type of energy is acoustic energy and said second type of energy is electromagnetic.

30. Apparatus as claimed in claim 29 and in which said medium is water, the means for directing and receiving said acoustic energy is sonar apparatus, and the means for directing and receiving said electromagnetic energy comprises light transmitting and indicating apparatus.

31. Apparatus as claimed in claim 30 and in which the light transmitting and indicating apparatus comprises flash illumination means and light recording means.

32. Apparatus as claimed in claim 31 and in which means is provided, responsive to a determination that the sonar apparatus has received reflection and scatter from said particular type of object, for causing the flash illumination means periodically to transmit flashes of light synchronously with the operation of said light recording means.

33. Apparatus as claimed in claim 32 and in which said light recording means comprises an elapsed time film-drive camera means.

34. Apparatus as claimed in claim 32 and in which said sonar apparatus is provided with means for determining relatively stationary and moving objects and selecting the said particular type of object therefrom.

35. Apparatus as claimed in claim 34 and in which said sonar apparatus is provided with at least one of means for sensing the approximate received sonar echo size and range, and means for gating sonar echoes to exclude echoes too close and too far from the light recording means to enable detection thereby, thereby to select the said particular type of object.

* * * * *